United States Patent [19]

Beard et al.

[11] 4,106,177

[45] Aug. 15, 1978

[54] METHOD OF WITHDRAWING ELONGATE TUBULAR MEMBERS

[76] Inventors: James Henry Beard; Cyril Lea; Bernard William Ludwig, all of Melton Mowbray, England

[21] Appl. No.: 651,811

[22] Filed: Jan. 23, 1976

[30] Foreign Application Priority Data

Jan. 24, 1975 [GB] United Kingdom ............... 3106/75
Aug. 24, 1975 [GB] United Kingdom ............. 34891/75
Aug. 23, 1975 [GB] United Kingdom ............. 35110/75
Jan. 24, 1975 [GB] United Kingdom ............... 3107/75

[51] Int. Cl.² ................................. B23P 19/02
[52] U.S. Cl. ................................. 29/427; 29/280; 29/726; 279/35
[58] Field of Search ............. 29/401 R, 401 A, 401 B, 29/401 C, 401 D, 401 F, 280, 427, 252, 726, 426; 90/64, 69, 96; 408/110, 111; 279/35, 106

[56] References Cited

U.S. PATENT DOCUMENTS

| 988,154 | 3/1911 | Thiemer | 279/35 X |
| 2,420,877 | 5/1947 | Geren | 90/96 |
| 2,429,888 | 10/1947 | Moore | 29/401 X |
| 2,814,238 | 11/1957 | Schupner | 90/69 |
| 2,832,604 | 4/1958 | Brusgue | 279/106 X |
| 3,260,163 | 7/1966 | Grof | 90/64 |
| 3,341,930 | 9/1967 | Belanger | 29/401 |
| 3,541,665 | 11/1970 | Ferris | 29/401 |

Primary Examiner—Leon Gilden

[57] ABSTRACT

An elongated tubular member is withdrawn from a bore in a support member by fixing at a leading end of the tubular member a hollow adapter, inserting through the tubular member and the hollow adapter a rod having an overall length greater than the combined length of the tubular member and the adapter, securing said rod to the adapter at one end of the tubular member, securing a broach to the rod at the other end, pulling the tubular member by suitable gripping means to withdraw it from the bore and thereby drawing the broach through the bore to re-shape it.

A suitable form of gripping means is also disclosed in the form of a hydraulically operated chuck.

7 Claims, 12 Drawing Figures

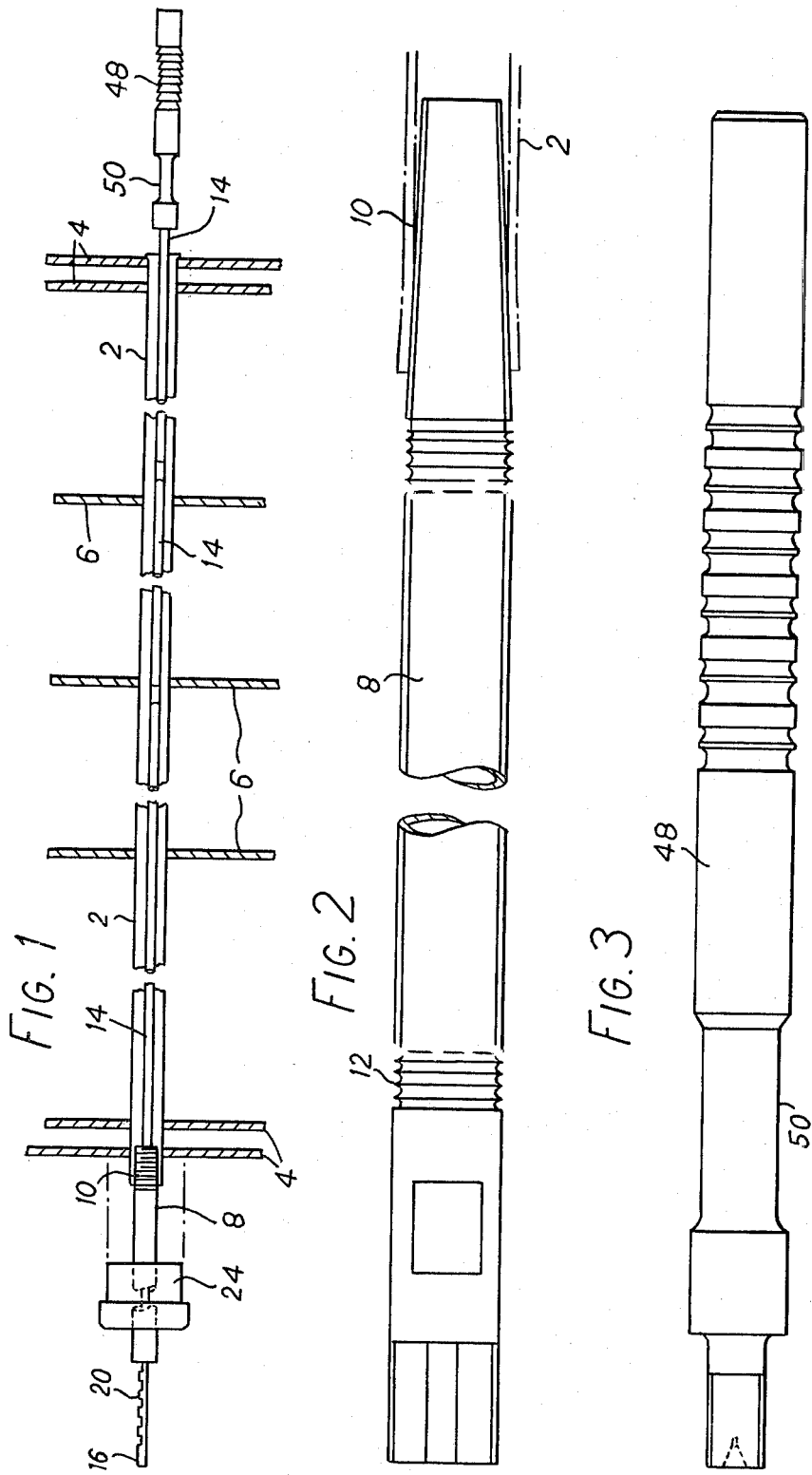

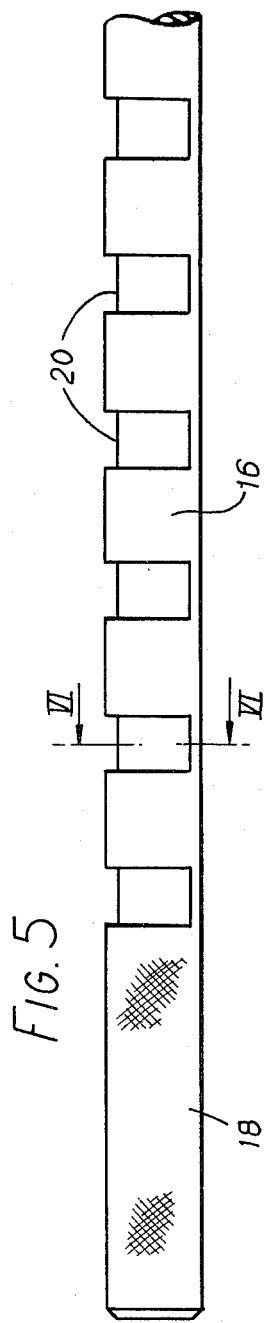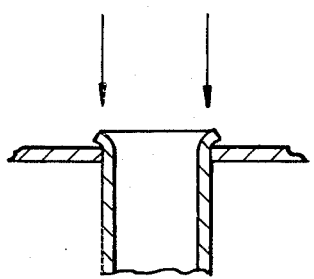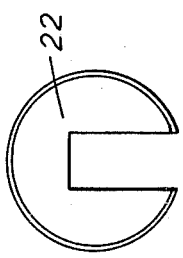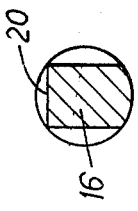

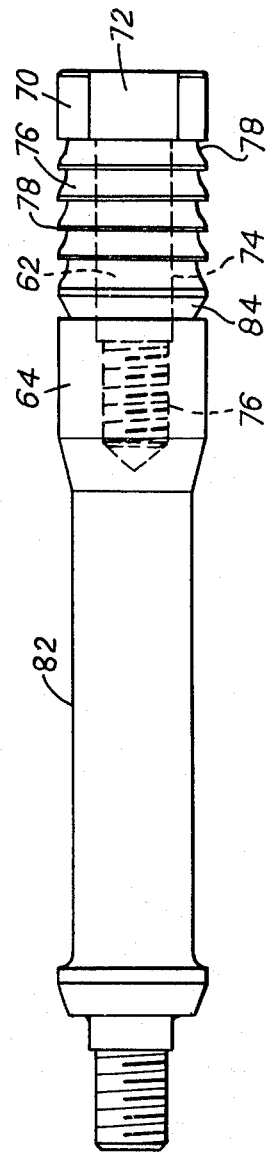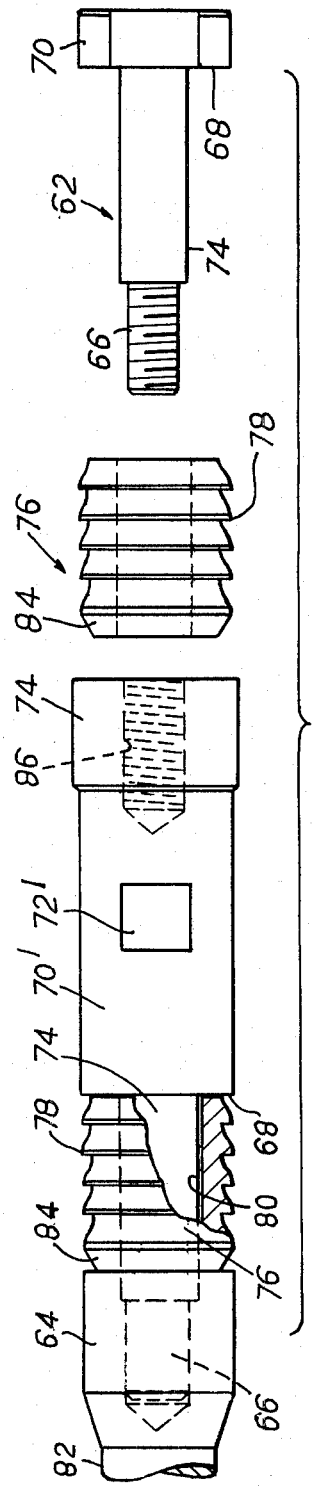

METHOD OF WITHDRAWING ELONGATE TUBULAR MEMBERS

BACKGROUND OF THE INVENTION

The invention relates to a method of withdrawing elongate tubular members from bores in support members. Particularly, the method involves the simultaneous reshaping of the bore for receiving a replacement tubular member.

Where a multiplicity of tubular members is received in a support member for use, for example, in a heat exchanger, evaporator or condenser, it will be appreciated that, in use, corrosion takes place between the tubular members and the support member which renders the original push-fit of the tubular members practically immovable without great difficulty and high labour costs.

Where the heat exchanger or condenser is installed in, for example, a power station, the tubular members may be up to 30 feet or even 70 feet in length requiring a plurality of support members spaced along their length. Moreover the tubular members themselves may number upwards of 200,000, where a plurality of condensers are used in one plant.

The problems hitherto involved in the replacement of such tubular members are enormous. It has been customary to cut the tubular members at locations either side of each support member so that "stubs" project from each bore. The stubs are then individually removed by force and the bore, which has been distorted by corrosion and the removal of the tubular member, afterwards re-shaped by reaming or broaching.

It has been suggested that it might be feasible to withdraw the tubular members by a straight forward pulling action, breaking the corrosion bond at each bore as the tubular member is drawn by the pulling action, but this still leaves the problem of the deformation of the bores.

It is therefore an object of the present invention to provide a method of withdrawing elongate tubular members from bores in support members, which provides a quicker easier operation than heretofor, leaves the bores in a condition for immediate insertion of replacement tubes and also appreciably reduces the time and cost involved when a system of tubular members, such as a condenser system in a power station, is being overhauled.

BRIEF SUMMARY OF THE INVENTION

The invention therefore provides a method of withdrawing an elongated tubular member from a bore in a support member and simultaneously re-shaping said bore for receiving a replacement tubular member, comprising the steps of fixing at a leading end of said tubular member a hollow adapter means constituting when so fixed an extension of said tubular member, inserting through the tubular member and the hollow adapter means a rod having an overall length greater than the combined length of the tubular member and the adapter means, securing said rod to the adapter means in the region of the leading end of the tubular member, securing a broach to the rod at the region of a trailing end of the tubular member, pulling the tubular member in an axial direction by suitable gripping means operating at least initially on said adapter means to withdraw the tubular member from the bore and thereby drawing the broach through the bore to re-shape it.

The method described above is particularly useful when the tubular member is to be pulled through the bores of a plurality of support members, as in the examples quoted elsewhere in this specification.

Advantageously, the method includes the additional step, immediately after the fixing of the adapter means at the leading end of the tubular member of applying a preliminary pulling action to the adapter means to pull the tubular member in said axial direction while the trailing end is held fast, so as to apply a drawing effect on the ductile metal of the tubular member to reduce the diameter of the tubular member, after which the trailing end of the tubular member may be freed, prior to withdrawal.

Conveniently the gripping means is arranged initially to pull the adapter means in a step-wise manner, with a pulling and gripping stroke alternating with a return non-gripping stroke. When the preliminary pulling action is over and the diameter of the tubular member reduced sufficiently, the second end of the tubular member is freed, and the stepwise action of the gripping means is resumed to withdraw the tubular member, during which the gripping means is in contact with the tubular member itself.

The gripping means conveniently comprises a chuck device capable of exerting a pushing or pulling effect upon a rod or elongate object, comprising a body portion having a centrally formed bore, a plurality of channels formed in the body portion to extend generally radially therethrough said channels being in communication with said central bore, a plurality of movable jaw members each mounted in one of said channels, for movement between an operative position in which an end portion of said jaw member projects into said bore and an inoperative retracted position, and biassing means arranged to urge said jaw members into their operative positions.

Preferably, the jaw members are pivotally mounted in the channels to facilitate retraction into the inoperative position brought about by relative movement between the chuck device and the rod or strut upon which it is operating.

Advantageously, the chuck device further comprises locking means to retain the jaw members in their inoperative position. Conveniently this locking means comprises a locking ring engageable with an end portion of each jaw member remote from said bore in the body portion.

In the example to be described hereinafter, there is provided, secured to the body portion of the device in co-axial arrangement, a hollow piston-rod of a conventional annular piston-and-cylinder arrangement, but it will be understood that the pulling action of the chuck device, which may be continuous or stepwise, may be brought about by a presser plate or other device acting as a yoke between two or more radially disposed piston-and-cylinder arrangements, which may conveniently react against the structure containing the bore from which the object is to be withdrawn.

If desired a plurality of chuck devices may be used, arranged to exert in sequence upon the rod or strut a pushing or pulling action, the construction and arrangement being that at least one device exerts a gripping action on the rod or strut to pull or push it, while there is relative slipping movement between the or an associated rod or strut and the jaw members of the inoperative device(s).

Conveniently the two chuck devices are provided which are arranged to operate in tandem, so that as one completes its operative stroke and releases the grip of its jaw members, so the second device grips the rod or strut and takes over the operation while the rod or strut slips through the jaws of the first device.

In addition, it has been found particularly advantageous if the broach used to re-shape the bore is a self-aligning broach. Conveniently, it will comprise an elongate body portion, provided at one end portion thereof with means for connection to a carrier member or the like and at the opposite end thereof with end stop means, the body portion having an intermediate cylindrical region, and a sleeve portion surrounding said intermediate region and captive in use against said end stop means to allow only movement in a direction radially of the broach, said sleeve portion having an outer surface bearing broach teeth, and an internal bore of dimension greater than that of the intermediate region of said sleeve portion so as to permit said movement radially of the broach, said sleeve member being further provided with a self-piloting leading edge.

Thus, the sleeve member may partake of radial movement with respect to the path of the broach through a plurality of successive bores and, provided the sleeve portion has an axial length less than the distance between successive bores, will be re-aligned, by means of the self-piloting leading edge, with each bore irrespective of whether the bores are accurately aligned with respect to that path.

BRIEF DESCRIPTION OF THE DRAWINGS

There will now be described in detail and with reference to the accompanying drawings, a method in accordance with the invention. It will be understood that the description is given by way of example of the invention only and not by way of limitation thereof.

In the drawings:

FIG. 1 shows in diagrammatic form an assembly of tools in position immediately prior to the pulling of a tubular member in an axial direction to withdraw it from a plurality of support members;

FIG. 2 shows an adapter means for use in the method of the invention;

FIG. 3 shows a broach;

FIG. 5 shows a final section of a rod for use in the method;

FIG. 6 shows a cross-section on line VI of FIG. 5;

FIG. 7 shows a C-washer adapted to engage the rod of FIGS. 5 and 6;

FIG. 8 shows a fragmentary view of a portion of FIG. 1, to an enlarged scale;

FIG. 11 shows a broach suitable for use with the method of the invention; and

FIG. 12 shows an alternative broach having a plurality of body portions each with its associated sleeve portion, part being shown in exploded form.

DETAILED DESCRIPTION OF THE DRAWINGS

Figure 4:
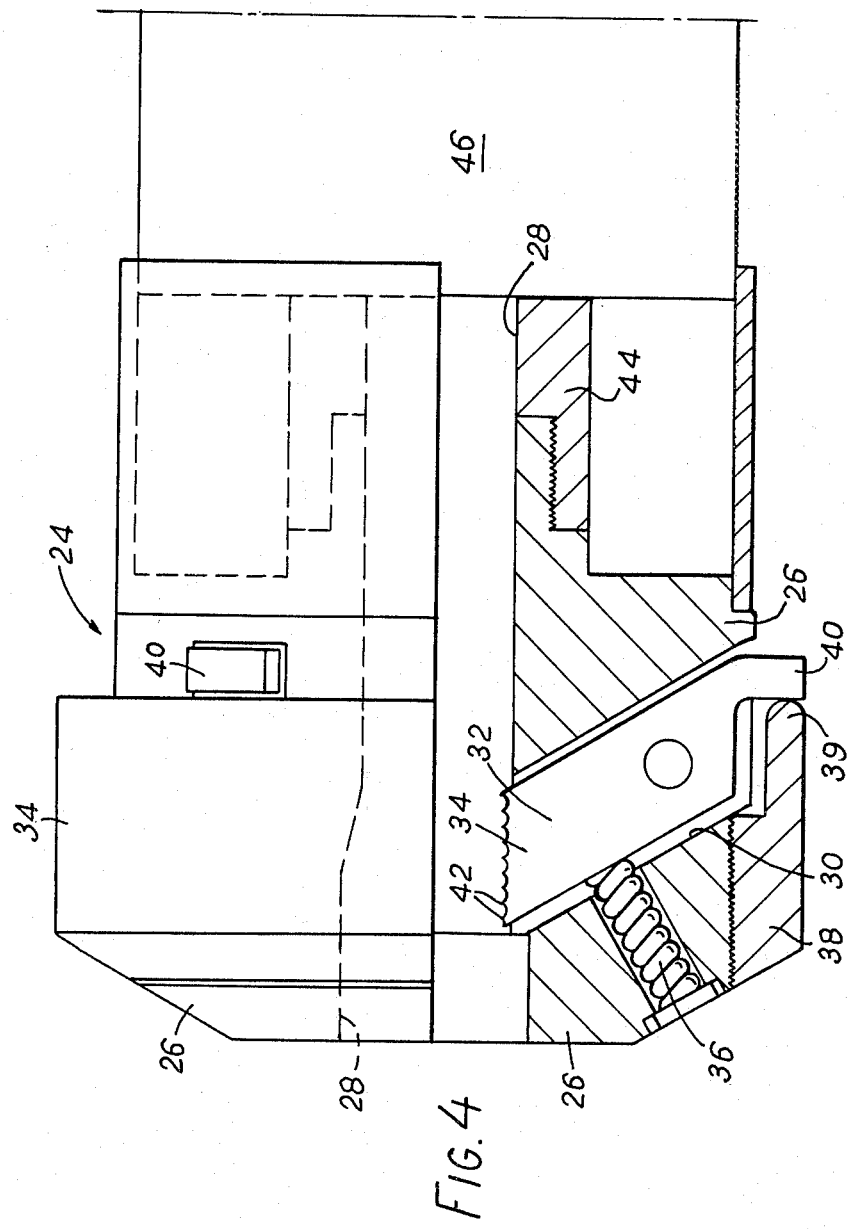
FIG. 4 shows a gripping means in side elevation, and partly in section.
Figure 9:
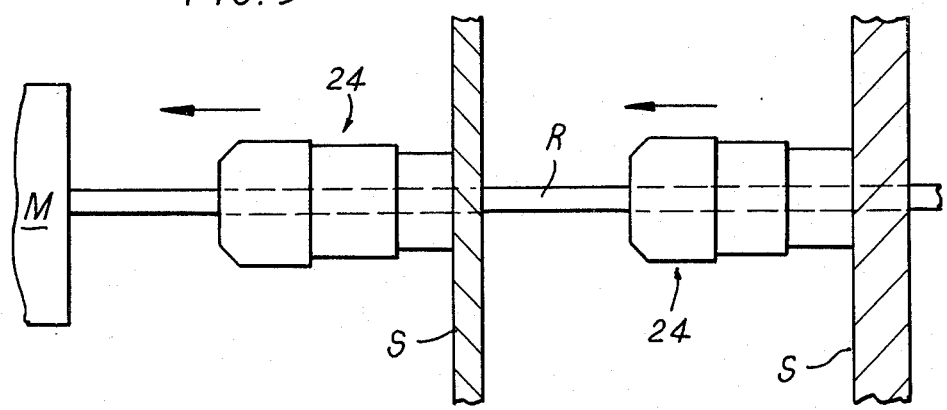
FIG. 9 is a diagrammatic representation of two chuck devices operating in tandem.
Figure 10:
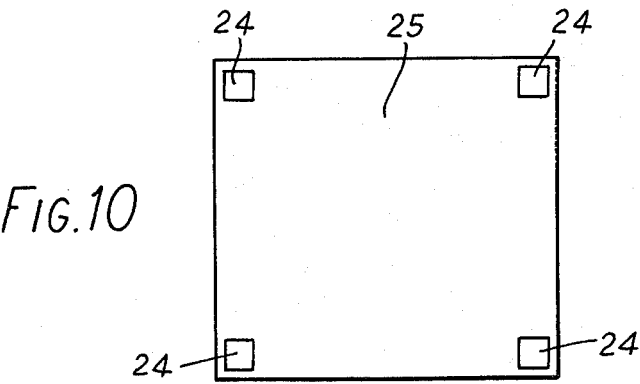
FIG. 10 is a diagram plan view of four devices working in co-operation.

The method to be described will be explained in the context of a condenser system as used for example in an electricity power station in which the condenser system comprises a plurality of sections each section consisting of some 30,000 horizontal tubular members spanning a chamber having a double wall and intermediate support members or plates through bores of which the tubular members are passed to prevent undue sagging. When the time comes for overhaul, the condenser system is taken out of commission for replacement of the condenser tubes. These will have become securely fixed in the bores of the walls and sagger plates through corrosion.

According to a preferred method of the invention, a tube 2 to be withdrawn from bores formed in the condenser walls 4 and intermediately disposed sagger plates 6, is provided with an adapter means 8, see FIGS. 1 and 2, in the form of an extension of the tube 2 and having a tapered nose portion 10. The nose portion, which is provided with a screw thread, is forced into a leading end of the hollow tube until it is securely held, the leading end of the tube being now in a slightly flared condition.

It is normal in a condenser system for one end of each condenser tube to be flared as shown in FIG. 8, this being part of the conventional construction. The nose portion of the adapter means may therefore merely enlarge the flare already present. However, if the adapter means is attached to the flared or belled end of the tube, a flare or bell must be formed at the second or trailing end of the tube to secure it in the wall 4 as hereinafter explained.

The main portion of the adapter means is provided with annular grooves 12, for reasons which will become apparent.

A rod 14 is now inserted through the hollow adapter means and the tube 2. This rod is constructed in interconnectable sections which are assembled together in an end-to-end manner until the first section of the rod emerges at the trailing end of the tube. A final section 16 of the rod is now fitted. This section 16, as shown in FIG. 5, comprises a knurled end portion 18 and an intermediate portion provided with notches 20, more clearly shown in the cross-sectional view of FIG. 6. A C-washer 22, FIG. 7, is provided for insertion into an appropriate notch as hereinafter explained.

A gripping means 24 is then mounted upon the adapter means 8. This gripping means 24 comprises an annular chuck device as shown in FIG. 4, comprising a main body portion 26 provided with a central axial bore 28 through which passes the adapter means and as the steps of the method progress, the tube 2. The body portion 26 is provided with three radially spaced channels 30 in each of which is mounted a pivotable chuck jaw 32. These jaws 32 are mounted for movement between an operative position in which an end portion 34 of the jaw projects into the central bore 28 and an inoperative, retracted, position. Biassing means in the form of compression springs 36 (only one shown) are arranged to urge the jaws into their operative positions. Locking means in the form of a locking ring 38 is provided, should it be required to lock the jaws 32 in their retracted position. It will be seen that turning the ring on its screw thread so that it travels to the right as shown in the Figure, causes an annular flange 39 to bear against a lug 40 on each jaw 32 to pivot the jaw against the influence of the compression spring.

The end portions 34 of the jaws 32 are provided with serrations 42, the pitch of the teeth of these serrations corresponding to the pitch of the annular grooves in the adapter means 8.

Secured to the body portion 26 of the chuck device is a hollow piston rod 44 of a conventional annular piston-and-cylinder device 46, which in operation reacts against the condenser walls 4. The chuck device is mounted for movement between one tube and another of the system on a gantry system of vertical side members supporting horizontal bars, along which the chuck device may be moved between operations.

As already mentioned, the trailing end of the tube 2 is secured in the walls 4 at the right of FIG. 1 by means of a belled or flared portion, shown to an enlarged scale in FIG. 8. When the chuck device of the gripping means 24 commences operation, its jaws 32 are caused to grip the grooves 12 of the adapter means 8 and the piston rod 44 moves to the left, so urging the jaws in the same direction. This exerts a pulling action on the tube 2 in an axial direction. The stroke of the piston and cylinder device is two inches in length, at the end of which the piston rod retracts under a spring-return arrangement, thus causing the jaws 32 to pivot into their retracted position and their end portions 34 to skid along the adapter means 8. At the end of the return stroke, the serrations 42 re-engage with a fresh section of the adapter means, and a further pulling stroke occurs. It will be understood that instead of the spring return arrangement, a double-acting piston-and-cylinder device may be used.

At the end of a predetermined number of such strokes, in the present example, six strokes, the action of the chuck device is interrupted, the tube 2, which is made of cupronickel, having been drawn to an extent where its diameter is reduced. This has the effect of breaking down the corrosion formed both between the tube and the mild steel sagger plates 6 and between the tube and the brass walls 4.

The belled portion of the trailing end of the tube 2 is then removed by a drilling operation acting in the direction of the arrows shown in FIG. 8.

A broach 48 is then secured to the rod 14 in the region of the trailing end of the tube 2. This broach is provided with a reduced neck portion, 50, the purpose of which will become apparent later on in the description.

The size of broach chosen will produce bores of the diameter required for a replacement tube.

At the lading end of the tube 2, the C-washer 22 is fitted to the projecting section 16 of the rod 14 in the one of the notches 20 nearest to the left-hand end of the adapter means 8. This effectively secures the rod to the tube 2.

The step-wise operation of the chuck device is then resumed. This time the tube 2 is pulled bodily in an axial direction and, because the rod is now effectively secured to the tube via the C-washer bearing on the adapter means, the rod is also pulled through the bores.

However, the rod has the broach secured to its trailing end and as the tube leaves each bore in the wall 4 and the plates 6, the broach is pulled through after it and accurately re-shapes the bore.

The pulling action of the chuck device continues until the tube is fully withdrawn. In order to reduce the time taken to complete the withdrawal, however, it is possible to override the automatic pulling action whenever the trailing end of the tube, together with the broach, is traversing the space between adjacent sagger plates. These are arranged at intervals of approximately 5 feet, and it will be appreciated that to traverse this distance in steps of 2 inches may result in considerable wastage of time. Therefore it is possible, during the return stroke of the chuck device, to take hold of the tube and withdraw it manually until resistance is felt as the tube end approaches the next plate. The jaws of the chuck device will merely skid along the tube as it is being handled in this way. The chuck device then resumes its manual stepwise operation upon the tube to pull the broach through the bore of the plate. It will be appreciated that the manual pulling of the tube is facilitated by the reduction in tube diameter about the initial pulling of the fixed tube, as explained above.

It is envisaged that overriding the action of the chuck device as described above may be arranged to occur automatically once the broach has successfully passed through each bore. Conveniently, an automatic overriding step may be initiated by the change in power requirement to pull the tube when the broach is freed.

When the trailing end of the tube passes through the condenser wall 4, and the broach has re-shaped the final bore, it is desirable to provide means for preventing the jaws of the chuck device from contacting the teeth of the broach, with consequent damage.

Therefore the broach 48 is provided with the neck portion 50, referred to above, having a reduced diameter which is less than that of the gripping position of the chuck jaws 32. The axial length of the neck portion is selected to be longer than that of the stroke of the chuck device, in the present example, being two and a quarter inches. Thus the chuck device cannot grip the broach itself and, if left unattended, will continue to stroke harmlessly.

When the withdrawal operation is complete, the gripping means in the form of the chuck device is moved from the location of the newly broached bore to the adjacent tube along the horizontal bar of the gantry system upon which it is mounted. The entire operation is then repeated.

Where the devices are required to move a heavy article by pushing, more than one device may be provided to operate on each of a plurality of rods secured to the article, designated M in FIG. 2. Each device 24 is provided with a surface S against which the piston and cylinder device reacts to push the jaw members forward.

When the operative stroke of the first device is complete, the second device grips its associated rod R and continues the pushing action (leftwards as viewed in FIG. 2).

Where, as in FIG. 3, a platform 25 is to be raised to a higher level, by inching upwardly by means of supporting rods, it may be found convenient to use four devices 24, operating these at diagonally opposed corners in turn so as to raise the platform in a substantially continuous movement, the operating devices holding the platform against slipping back toward ground level, while the jaw members of the other two devices are released.

FIG. 11 shows the first broach to be described consisting of an elongate body portion 62 provided with one end portion thereof with means for connection to a connector member 64, in the form of screw threaded spigot 66. At the opposite end portion of the body portion 62 is an end stop in the form of a shoulder 68 of an end cap 70, having spanner flats 72.

A cylindrical intermediate region 74 of the body portion 62 receives a sleeve portion 76, an outer surface of which is provided with broach teeth 78 and an internal bore of which is of a diameter greater than that of the diameter of the intermediate region 74. This is more clearly shown in FIG. 12, where a clearance is illustrated at 80 corresponding to a clearance (not shown) in the broach of FIG. 11.

The connector member 64 corresponds in function to the leading, plain, portion of a conventional broach such as is shown at 48 in FIG. 3 of the drawings, which shows an elongated broach having conventional fixed broach teeth provided on a trailing region thereof.

In the present example the connector member 64 is provided with a portion 82 having a reduced diameter corresponding to the portion 50 of the broach 48 of the other drawings, for reasons which will be described later in this specification.

The broach of FIG. 11 is assembled by threading the sleeve member 76 onto the intermediate region 74 of the body portion 62.

The spigot 66 is then screwed into a corresponding threaded bore of the connector member 64 until the sleeve is held captive against axial movement between the shoulder 68 and the end face of the connector member 64. However, because of the clearance explained above between the sleeve member 76 and the intermediate region 74, a small amount of radial movement is possible, the amount of which is controlled by the contact of a tapered, self-piloting leading edge surface 84 of the sleeve member 76 with the edge of the bore or aperture to be broached.

FIG. 12 shows a second example of a broach according to the invention in which a number of sleeve portions 76 are assembled on elongate body portions 62 connected end-to-end. Referring to the left hand side of the Figure, the connector member 64, shown in fragmentary form for convenience, receives the spigot 66 of an intermediate stop member 70' corresponding in function to the end stop member 70 of FIG. 11 in so far as it is also provided with a shoulder 8. Member 70' is however extended to provide a further spigot-receiving bore 86 to receive the spigot 66 of an end stop member 22 as shown in the Figure, of if desired of a further intermediate stop member. The member 70' is provided with spanner flats 72' for ease of assembly.

In use, either of the two broaches described may conveniently be used in a horizontal position to pass successively through a series of more or less accurately aligned bores in a plurality of plates or walls. The sleeve members 76 will drop under the influence of gravity until the leading edge surface 84 projects beyond the member 64 so that on contact with the edge of the bore to be broached, the sleeve member partakes of a radial movement until it is aligned with the bore, which may be up to, for example, 0.015 inch off the centre line of the path of the broach.

The broaches described above are conveniently used in the present invention in the replacement of condenser tubes in a power station, in which the end walls and intervening sagger plates of the condenser plant may well have tube-receiving bores which are slightly misaligned.

We claim:

1. Apparatus for withdrawing an elongated tubular member from a bore in a support member, said apparatus comprising an adapter means having means for fixedly securing the same on a leading end portion only of the tubular member so as to form an extension thereof, and gripping means for initially gripping said adapter means and effecting pulling of said adapter means therethrough and the the tubular member in an axial direction through the bore in the support member, said gripping means including means for gripping both said adapter means and the tubular member in sequence to continue the pulling of the tubular member through said gripping means after said adapter means has passed through said gripping means.

2. Apparatus according to claim 1 wherein said adapter means is hollow, a broach, a rod capable of passing through the adapter means and having means for securing said broach at a remote end thereof to the adapter means, and said gripping means being capable of concomitantly pulling the broach through the bore after the tubular member.

3. Apparatus as claimed in claim 2, wherein said gripping means is a chuck device including a body portion having a centrally-formed bore, a plurality of channels formed in the body portion to extend generally radially therethrough with said channels being in communication with said central bore, a plurality of movable jaw members each mounted in one of said channels, for movement between an operative position in which an end portion of said jaw member projects into said bore and an inoperative retracted position, and biassing means arranged to urge said jaw members into their operative positions.

4. Apparatus as claimed in claim 3, wherein the jaw members are pivotally mounted in the channels to facilitate retraction into their inoperative position in response to relative movement between the chuck device and said adapter means.

5. Apparatus as claimed in claim 4 wherein locking means are provided to retain the jaw members in their inoperative position said locking means including a locking ring engageable with an end portion of each jaw member remote from said bore in the body portion.

6. Apparatus as claimed in claim 2 wherein the broach comprises an elongate body portion, provided at one end portion thereof with means for connection to said rod and at the opposite end thereof with end stop means, the body portion having an intermediate cylindrical region, and a sleeve portion surrounding said intermediate region and captive in use against said end stop means to allow only movement in a direction radially of the broach, said sleeve portion having an outer surface bearing broach teeth, and an internal bore of dimension greater than that of the intermediate region of said sleeve portion so as to permit said movement radially of the broach, said sleeve member being further provided with a self-piloting leading edge.

7. Apparatus according to claim 1 wherein said adapter means has an externally grooved portion, and said gripping means includes jaws having serrated faces for cooperation with said adapter means grooved portion for forming positive interlocks between said gripping means and said adapter means.

* * * * *